United States Patent [19]
Yagasaki et al.

[11] Patent Number: 6,041,160
[45] Date of Patent: Mar. 21, 2000

[54] METHOD AND APPARATUS FOR PICTURE ENCODING AND DECODING

[75] Inventors: Yoichi Yagasaki; Katsumi Tahara, both of Kanagawa, Japan

[73] Assignee: Sony Corporation, Tokyo, Japan

[21] Appl. No.: 08/879,038

[22] Filed: Jun. 19, 1997

[30] Foreign Application Priority Data

Jun. 21, 1996 [JP] Japan ................................... 8-162236

[51] Int. Cl.[7] ................................................. H04N 5/91
[52] U.S. Cl. ................................. 386/94; 386/111; 380/10
[58] Field of Search ............................ 386/46, 111, 112, 386/124, 94; 380/10, 5, 30; H04N 5/91

[56] References Cited

U.S. PATENT DOCUMENTS

| | | | |
|---|---|---|---|
| 4,200,770 | 4/1980 | Hellman et al. ........................... | 380/30 |
| 5,191,436 | 3/1993 | Yonemitsu ................................ | 386/112 |
| 5,546,461 | 8/1996 | Ibaraki et al. ............................. | 380/10 |
| 5,706,346 | 1/1998 | Katta et al. ................................ | 380/10 |
| 5,897,218 | 4/1999 | Nishimura et al. ........................ | 386/94 |

*Primary Examiner*—Huy Nguyen
*Attorney, Agent, or Firm*—Frommer Lawrence & Haug, LLP.; William S. Frommer

[57] ABSTRACT

A picture encoding method in which the picture signal can be scrambled without deteriorating the picture quality of the encoded picture of the MPEG system. A B-picture f the input picture signal is given random offset in the horizontal direction on the slice basis and encoded by an MPEG encoding device. An offset amount is written as a key on the disc along with the encoded data. A decoding device corrects the offset amount in the slice basis using the key of the reproduced signal. The picture signal can be scrambled in this manner without modifying the MPEG system.

12 Claims, 9 Drawing Sheets

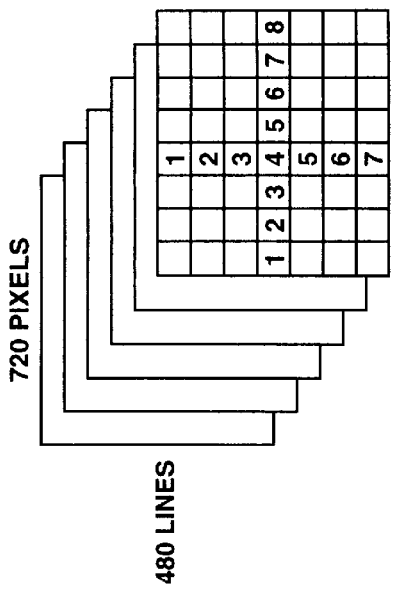
FIG.4A
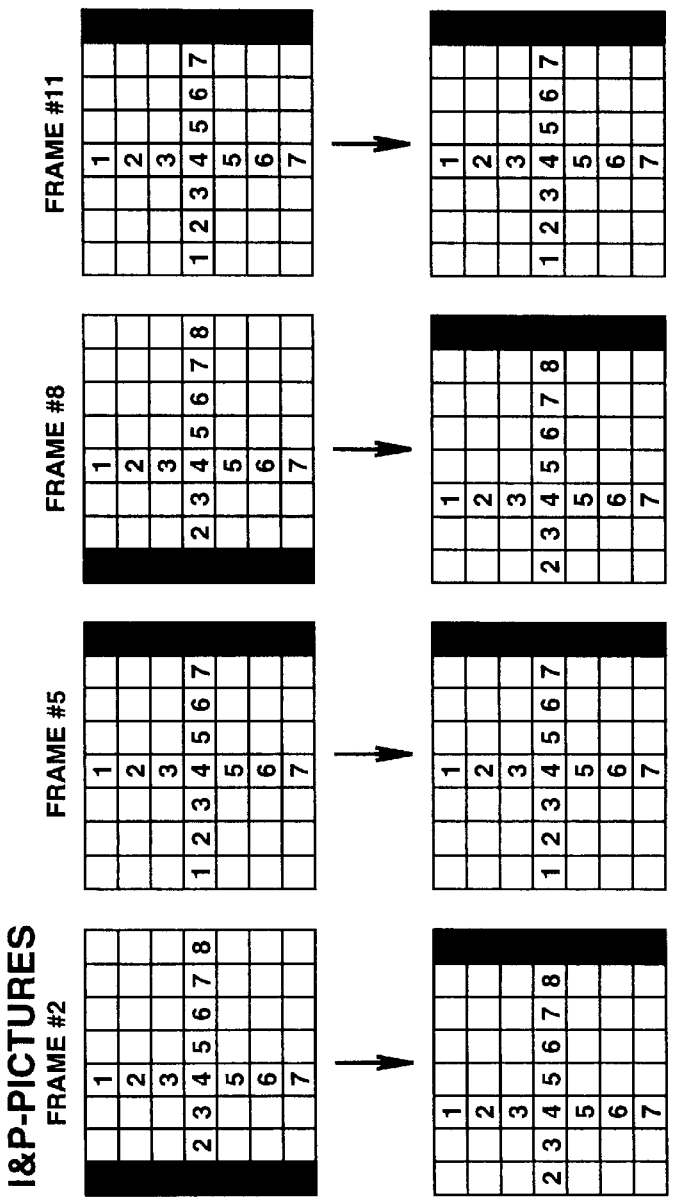
FIG.4B
FIG.4C

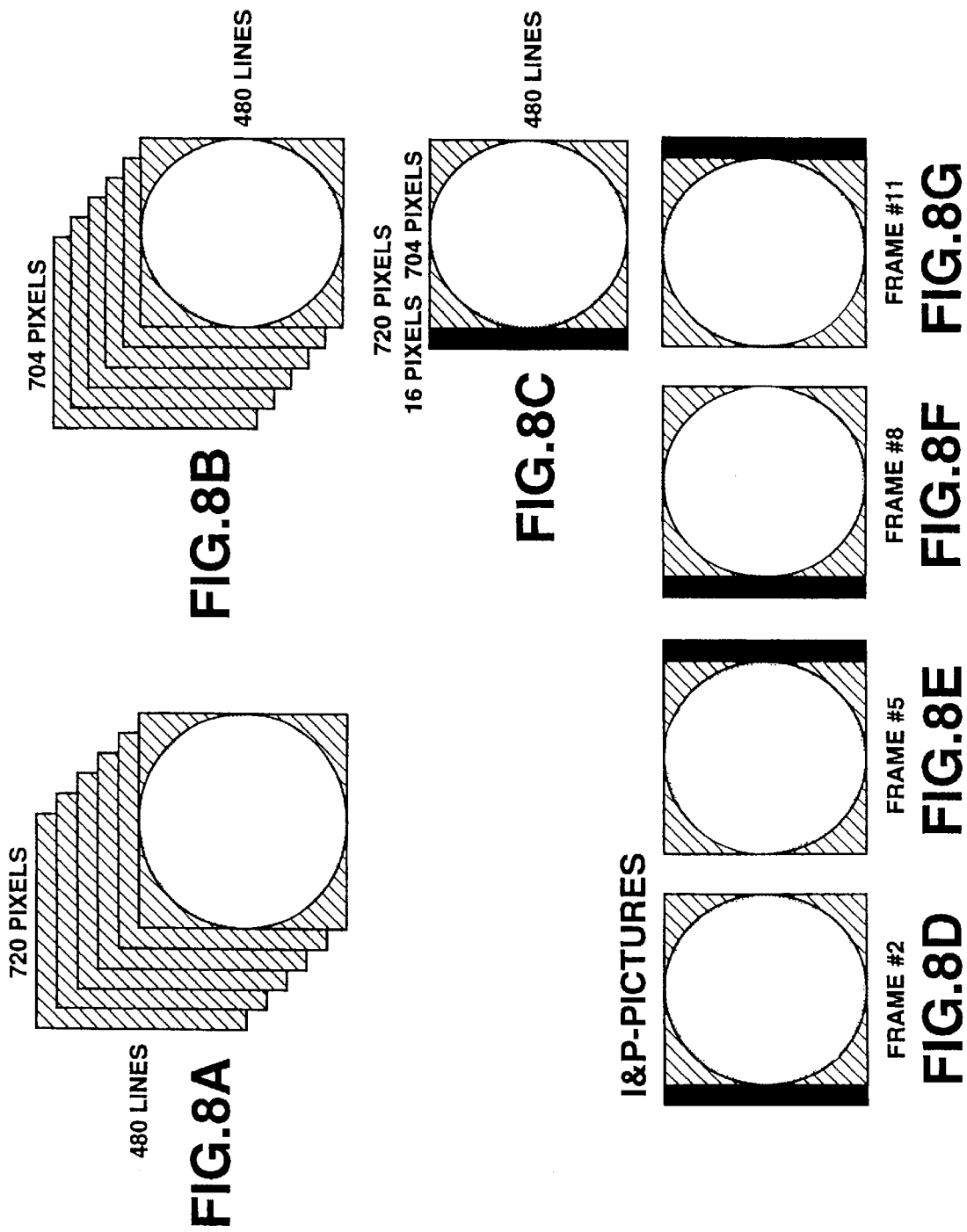

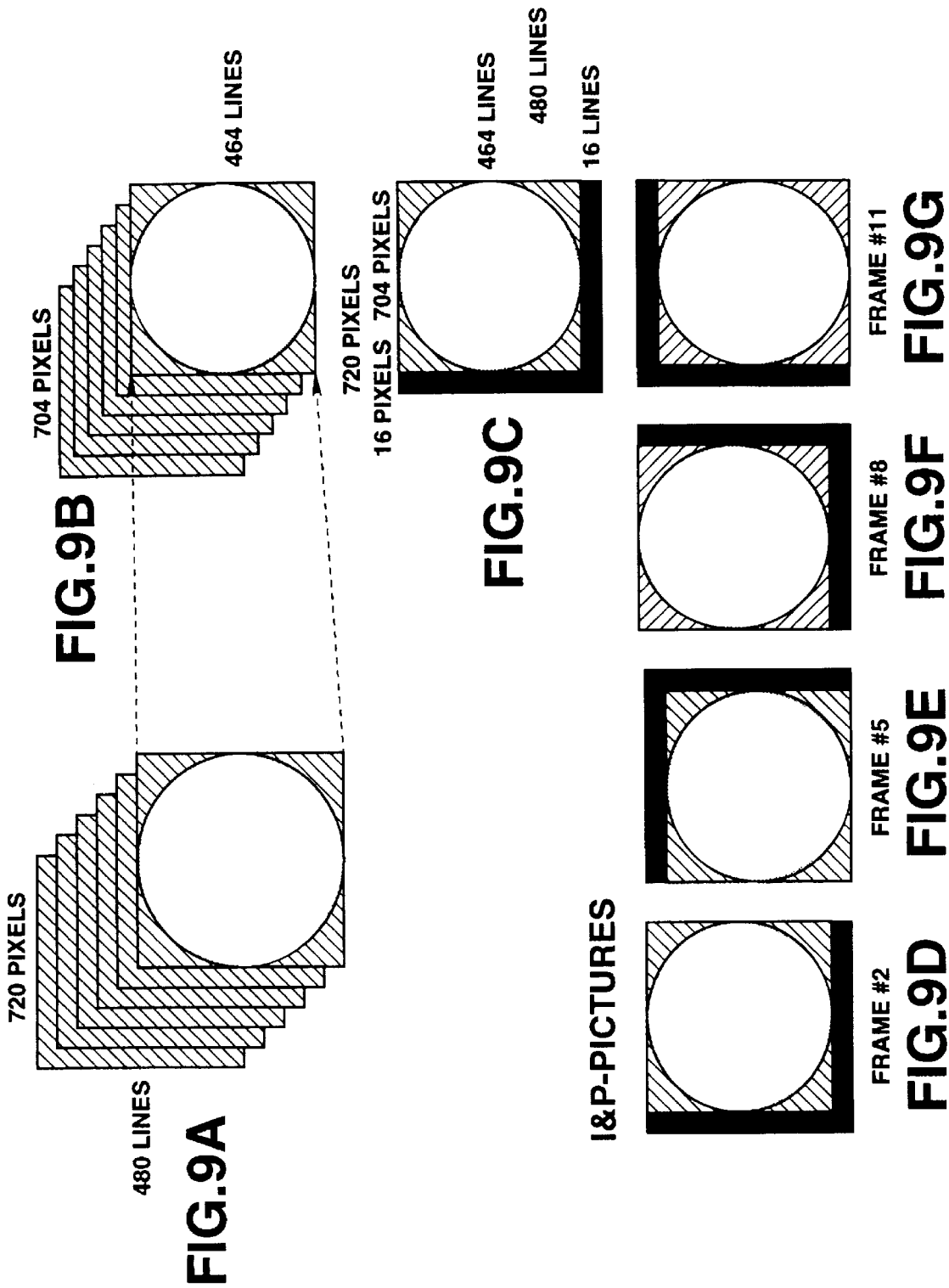

METHOD AND APPARATUS FOR PICTURE ENCODING AND DECODING

BACKGROUND OF THE INVENTION

1. Field of the Invention

This invention relates to a picture encoding method, a picture signal recording medium and a picture encoding apparatus. More particularly, it relates to a picture encoding method, a picture signal recording medium and a picture encoding apparatus employed in a system for storage-encoding and recording video signals of a moving picture on a picture signal recording medium, such as an optical disc, magnetic disc or a magnetic tape or in a system for transmitting video signals of a moving picture over a transmission path.

2. Description of the Related Art

For digitally recording picture data on a magneto-optical disc or a magnetic tape, or transmitting the picture data over a pre-set transmission medium, data is encoded or compressed for reducing the data volume.

The following description is made in connection with the use of the Moving Picture Image Coding Experts Group (MPEG) encoding standard as an encoding standard.

In encoding by the MPEG system, a video sequence is divided n terms of a group-of-pictures (GOP), made up of, for example, 15 frames, as a unit. Each frame is divided by the prediction system into the following three types:

- an I-picture or an intra-frame coded picture;
- a P-picture or a predictive-coded picture which is a forward predictive-coded picture obtained on motion prediction from past and future P- or I-pictures; and
- a B-picture or a bidirectionally predictive-coded picture, obtained on motion prediction from past and future P- or I-pictures.

In such MPEG compression system, each frame picture is predicted with the prediction mode for the I-picture, P-picture or the B-picture, and the resulting prediction error is encoded and transmitted. Since basically the prediction error only is transmitted, the data volume can be compressed as compared to a case of directly transmitting picture data of each frame.

The relation between these picture types in shown in FIGS. 1A and 1B, of which FIG. 1A shows the relation of reference between an I-picture and P-pictures. In FIG. 1A, an I-picture is shown by cross-hatching, while P-pictures are shown by hatching. FIG. 1B shows the relation of reference between the B-pictures and the I-picture/P-pictures. By the pre-set number of pictures, as shown, there is formed a set of pictures or a picture string, termed a group-of-picture.

FIG. 2 shows a structure of each picture. Each picture or frame is made up of plural units termed slices resulting from slicing in a horizontal direction. Each slice, in turn, is formed by a pre-set number of macro-bocks, with each macro-block being made up of four luminance blocks composed of 8×8 pixels of luminance data and each one chroma block composed of 8×8 pixels of chroma data.

Meanwhile, in a chargeable TV system, scrambling is used for limiting viewing by other than contractors. For this scrambling, an electronic key is accorded to a receiver of each contractor. The picture data of broadcasting signals are modified, such as by inversion of white and black colors, in the blanking periods, such that scrambling cannot be resolved in the absence of the electronic key.

Similar scrambling is also demanded of a recording medium, such as a disc. That is, since a digitally recorded video disc is not deteriorated in picture quality on repeated copying, there is a risk that unauthorized copies be produced and offered in large quantities.

Thus it has been envisaged to use a publicly open key system enabling reproduction of only an authorized disc. The publicly open key system is not explained herein in detail since it belong to a prior art disclosed in, for example, U.S. Pat. No. 4,200,770 and other numerous publications.

Such scrambling cannot be applied satisfactorily in case of using the MPEG system. For example, the conventional method of applying an artifice in the blanking period cannot be used since the blanking periods are not used from the outset in the MPEG system.

SUMMARY OF THE INVENTION

It is therefore an object of the present invention to provide a picture encoding method, a picture signal recording medium and a picture encoding apparatus which resolve the above-mentioned drawbacks.

In one aspect, the present invention provides a picture encoding method of encoding an input picture signal by an MPEG encoding method, including adding at least a set of invalid macro-blocks on a peripheral portion of the input picture signal, outputting a signal identifying the position of addition, scrambling the picture signal by varying the position of the set of the macro-blocks responsive to a sequence, MPEG encoding the scrambled picture signal and multiplexing the MPEG encoded picture signal with the signal identifying the position of addition and outputting the resulting multiplexed signal.

In another aspect, the present invention provides a picture signal recording medium having at least scrambled picture signals recorded thereon, wherein the picture signals are recorded thereon by adding at least a set of invalid macro-blocks on a peripheral portion of the input picture signal, outputting a signal identifying the position of addition, scrambling the picture signal by varying the position of the set of the macro-blocks responsive to a sequence, MPEG encoding the scrambled picture signal and multiplexing the MPEG encoded picture signal with the signal identifying the position of addition and outputting the resulting multiplexed signal.

In yet another aspect, the present invention provides a picture decoding device for forming moving pictures from at least a scrambled MPEG encoded picture signal including means for separating at least the MPEG encoded picture signal and the signal identifying the position of addition from the multiplexed signal, means for decoding the MPEG encoded picture signal, means for correcting the offset of the decoded picture signals depending on the position of addition for descrambling the picture signal and means for outputting at least the descrambled picture signals.

The picture signal is scrambled by giving offset by a set of macro-blocks on the peripheral portion of picture data supplied to an MPEG encoder. Also, data (key) for identifying the location of the set of macro-blocks is supplied separately from the encoded data.

The encoded data and the key are written in distinct areas of the same disc.

The decoder finds the key from the reproduced signal and corrects the offset by the set of macro-blocks from this key for descrambling the picture signals. The present invention is applied to, above all, I- or P-pictures for effectively scrambling the picture signal without modifying the pre-existing MPEG system.

According to the present invention, the picture data sent to the MPEG encoder is added to with the set of macro-blocks made up of invalid pixels and the position of addition is supplied as a key separately from the encoded data, so that the picture signal can be scrambled by directly employing the MPEG standard.

BRIEF DESCRIPTION OF THE DRAWINGS

FIGS. 4A to 4C illustrate scrambling according to a first embodiment of the present invention.

FIGS. 8A to 8G illustrate scrambling according to a second embodiment of the present invention.

FIGS. 9A to 9G illustrate another scrambling according to the second embodiment of the present invention.

DESCRIPTION OF THE PREFERRED EMBODIMENTS

Figure 1A:
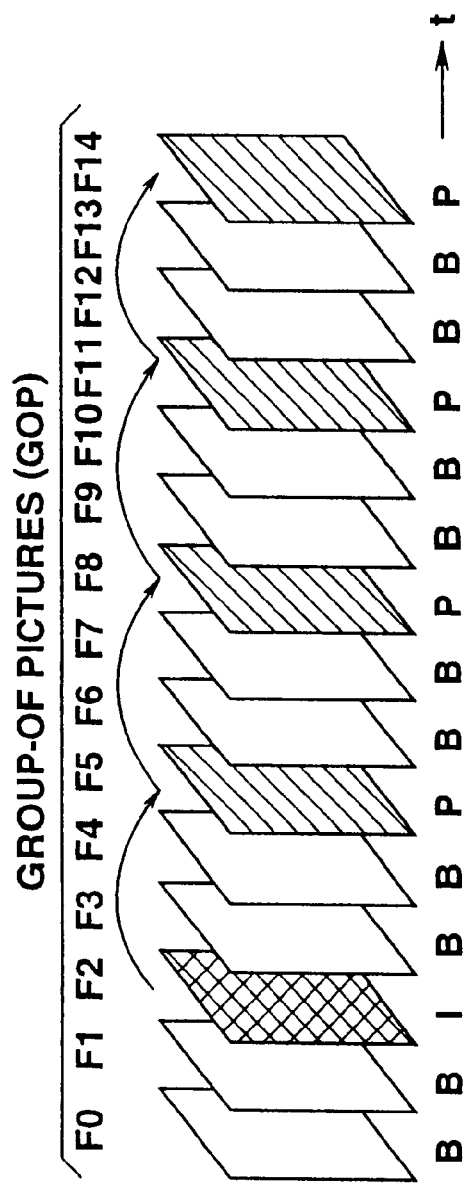
FIGS. 1A and 1B illustrate MPEG bitstreams.
Figure 1B:
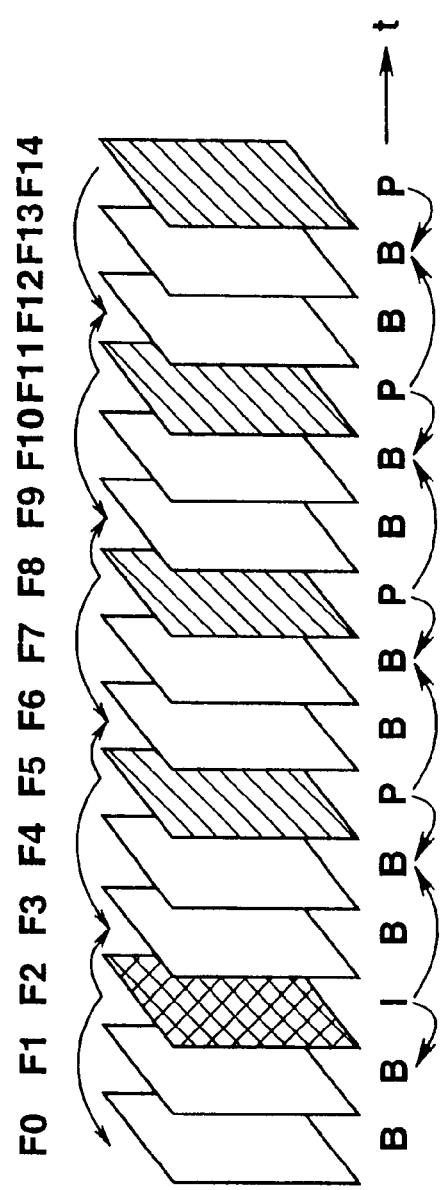
Figure 2:
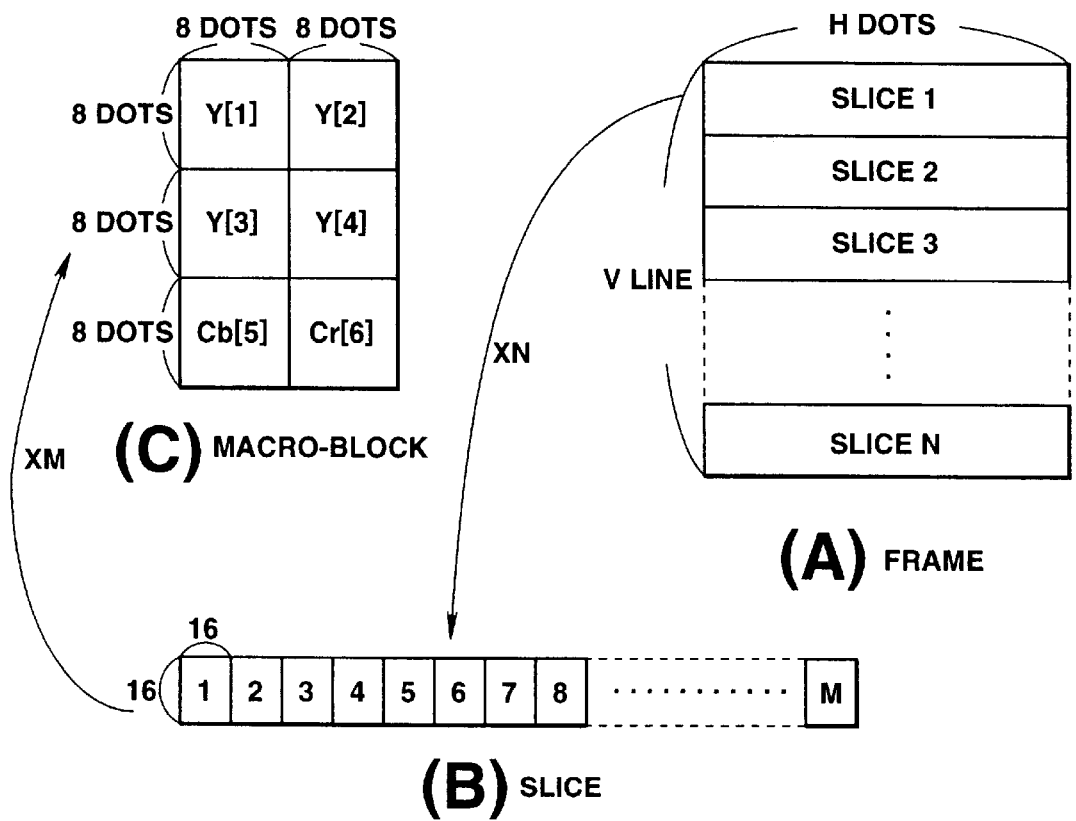
FIG. 2 illustrates an MPEG slice structure.

Referring to the drawings, preferred embodiments of a picture encoding method, a picture signal recording medium and a picture encoding device of the present invention will be explained in detail.

Figure 3:
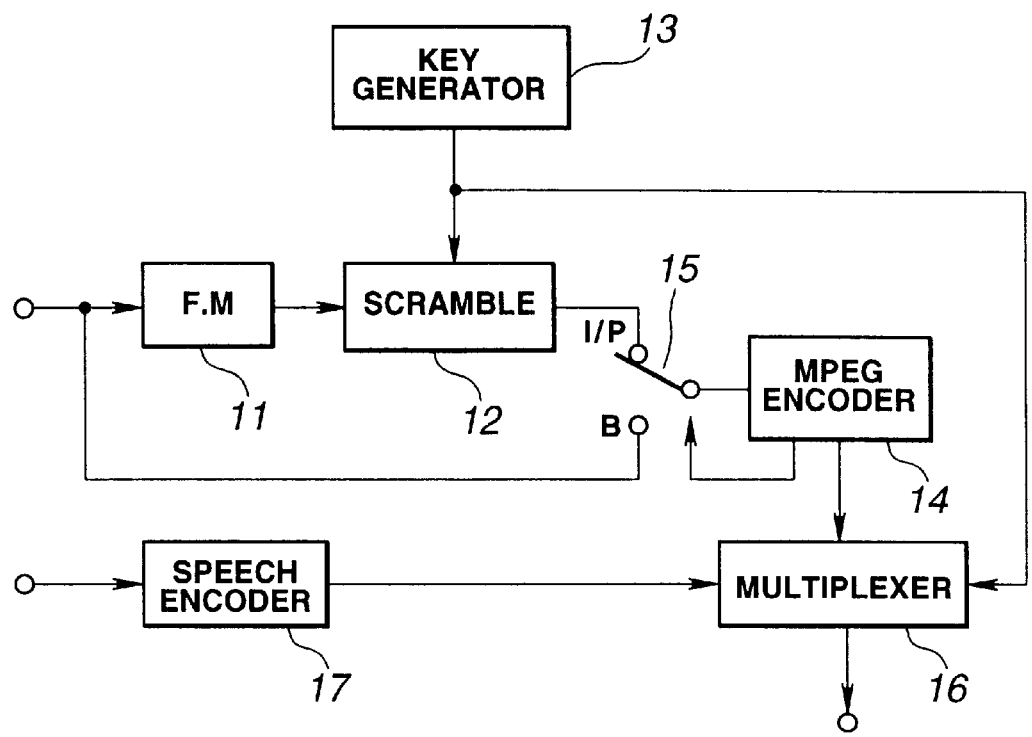
FIG. 3 is a block diagram for illustrating a first embodiment of the picture encoding method according to the present invention.

FIG. 3 shows a block diagram of a first embodiment for illustrating the basic operation of the picture encoding method according to the present invention. This picture encoding method is applied to encoding of input picture signals in accordance with the MPEG system.

FIGS. 4A to 4C schematically illustrate the manner of picture scrambling by picture examples for facilitating understanding of the present invention.

Referring to FIG. 3, 11 is a frame memory for storage of a frame of an input digital picture.

FIG. 4A shows pictures stored in the frame memory 11. For facility in explanation, a picture is blocked and numerical figures are entered in specified areas. In FIG. 3, 12 denotes a scrambler for substituting a set of macro-blocks comprised of invalid pixels on at least one of upper and lower sides and left and right sides of each picture supplied from the frame memory 11. The invalid pixels mean pixels having dc values, such as gray or black color.

In FIG. 4B, the invalid pixels are those shown in black on the left or right sides of each picture. Since each macro-block is comprised of 16×16 pixels, the left or right side macro-blocks on a regular picture are canceled.

The volume (width) of the group of macro-blocks, composed of invalid pixels, is determined as follows:

If the input digital picture is made up of 720 horizontal pixels and 480 vertical pixels (lines), and if several macro-blocks on the left or right side are replaced by invalid pixels, there is a risk that these invalid pixels become visible.

Our experiments have revealed that one macro-block (16 pixels) is masked by a screen frame of a TV receiver and hence is not visible even if there exist such signals on the right or left ends of the decoded picture, and that a macro-block at an upper or lower end, if replaced by invalid pixels, is similarly masked by the screen frame of the TV receiver and hence is not visible.

It has also been confirmed that a width of one macro-block suffices to give the scrambling effect. From the above results, a macro-block width is selected in the present invention.

The macro-block location on the upper or lower or left or right sides is determined as follows:

A key generator 13 generates keys at random, such as 0-3-2-0-1-, where 0, 1, 2 and 3 denote left side, right side, upper side and the lower side locations of substitution by the macro-block composed of invalid pixels.

In the examples of FIGS. 4A to 4C, only left and right sides are replaced by the macro-blocks composed of invalid pixels. Therefore, location designation from the key generator 13 is 0-10-1-. The location designation may also be periodic instead of being random, or associated with even or odd numbers of the frame addresses.

In this manner, a group of invalid pixels are added to a picture. The areas of the invalid pixels are then shifted to the right side of the picture. That is, in FIG. 4C, the left-side area of invalid pixels is shifted to the right side of the picture. Thus the presence of invalid pixels leads equivalently to deviation of the center of the picture towards left or right. This becomes apparent from checking the numerical figures in the picture of FIG. 4C.

Figures 5A, 5B, 5C:
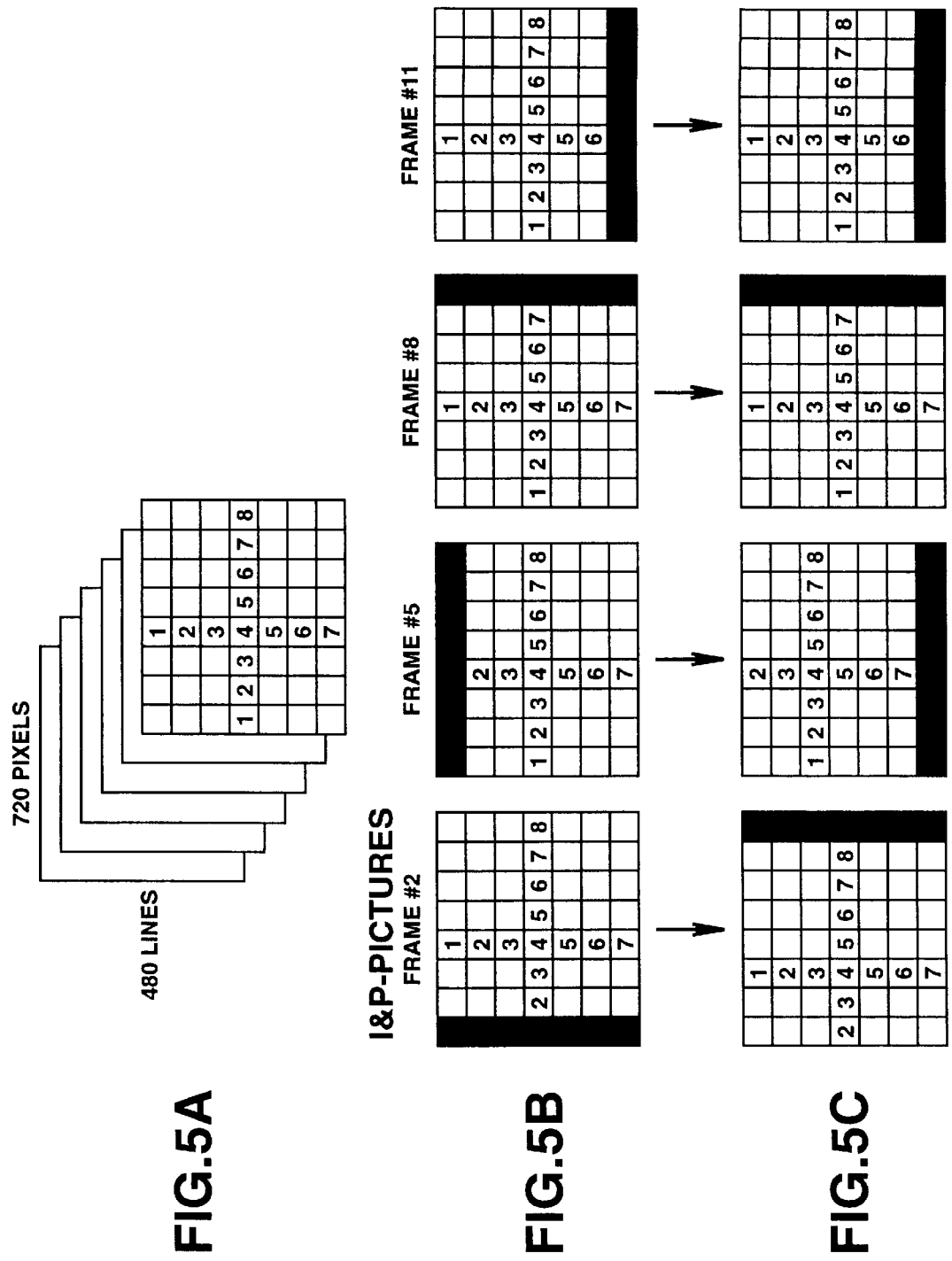
FIGS. 5A to 5C illustrate another scrambling according to the first embodiment of the present invention.

In FIGS. 5A to 5C, the locations of the macro-blocks are left, right, upper and lower sides of the pictures. Thus the key of 0-2-1-3- is supplied. In this case, too, the key may be periodic.

The picture data, wobbled in the horizontal direction by the scrambler 12, are routed to an MPEG encoding device 14. The pictures are encoded in the GOP sequence, that is as I/P/B pictures.

Since the MPEG encoding device 14 outputs picture types of I/P/B, a selection device 15 selects an output of the scrambler 12 or an input picture, depending on the picture types.

That is, although all pictures can be scrambled, only I/P pictures are scrambled in the instant embodiment. That is, the I/P pictures can be decoded easily and account for one-third of the total pictures, so that there are occasions wherein only these pictures are reproduced intermittently. It is therefore effective to scramble the I/P pictures.

Although not shown, the pictures encoded as I/P pictures are processed via frame memory, thus producing time delay. Thus it becomes necessary to provide a circuit which accords the same time delay to the picture encoded as a B-picture.

The MPEG bitstreams and key signals, generated as described above, are multiplexed by a multiplexer 16 into multiplexed recording signals, along with voice signals or other data, so as to be recorded on a recording medium, such as a disc.

A decoding device having recorded thereon picture signals scrambled in accordance with the present method is explained in detail.

Figure 6:
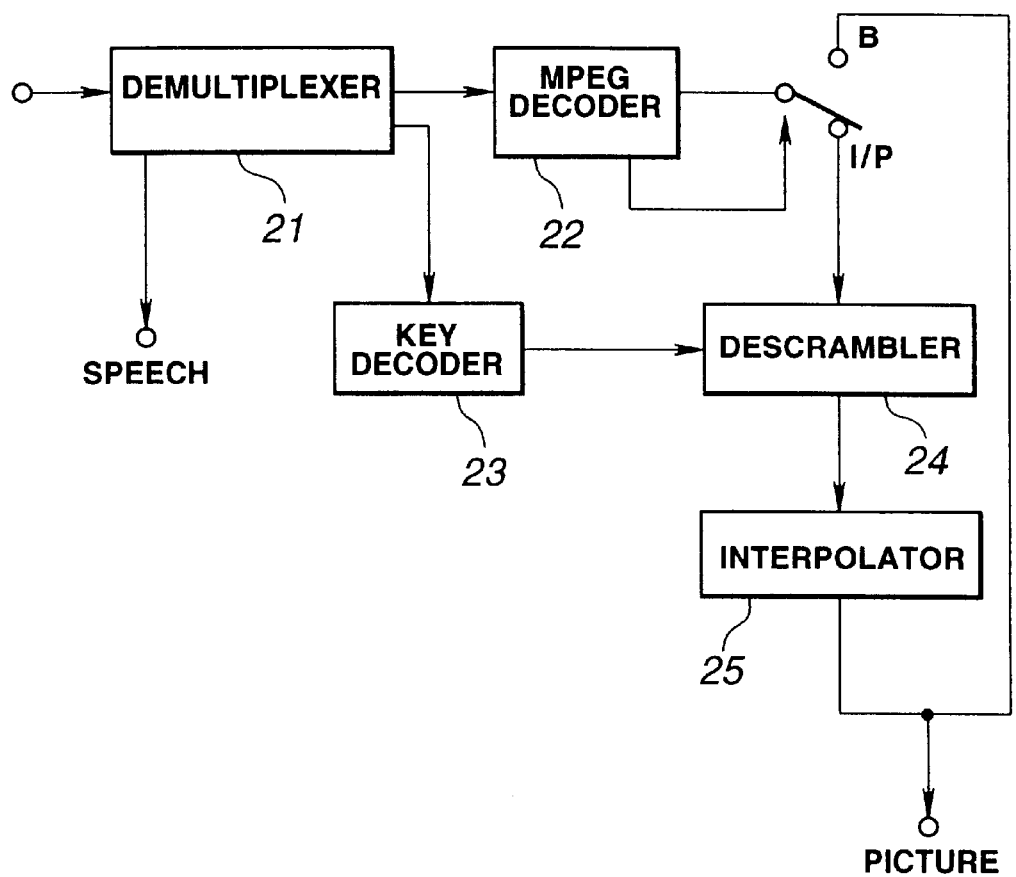
FIG. 6 is a block diagram for illustrating the basic operation of a picture decoding device according to the present invention.

FIG. 6 shows an illustrative structure of a decoding device.

The reproduced signals from a recording medium are separated by a demultiplexer 21 into encoded picture signals, key signals and speech signals. The encoded picture signals are decoded by am MPEG decoder 22 into decoded picture signals. The picture types are derived from the MPEG bitstreams.

The key signals are first deciphered by a key decoder 23 and inspected as to adaptability of the reproducing device. If the decoding permission is not issued to the reproducing device, the descrambling is not performed. That is, the key signals are not accorded or incorrect key signals are accorded to the descrambler 24. The descrambler 24 cannot correct picture deviation to the picture signals encoded as I- or P-pictures sent from the picture selection device 26, but only sends the disturbed picture to the downstream side processing devices. Thus, the downstream side processing devices process the disturbed pictures directly as normal pictures, so that the I/P pictures are displayed as if these pictures are oscillated in the left-and-right or up-and-down directions, thus displaying extremely awkward moving pictures.

Conversely, if the permission is given the reproducing device, key signals are accorded to the descrambler 24. Since these key signals correspond to the location of the macro-block composed of invalid pixels, the descrambler 24 corrects the offset by a macro-block width of the picture from the picture selection device 26 encoded as the I- or P-picture.

An interpolator 25 substitutes a set of neighboring macro-blocks for the macro-block composed of invalid pixels so that, if the invalid data are positioned on the inner side of the screen frame of the TV receiver, black or gray colors are not displayed.

A second embodiment of the present invention is now explained.

In the previous embodiment, there exist neighboring macro-blocks that cannot be transmitted because of substitution by invalid pixels. In the present embodiment, 720 horizontal pixels of input picture signals are previously compressed to 704 pixels by exploiting the interpolator and 16 pixels are secured as an area in which to write the invalid pixels.

Figure 7:
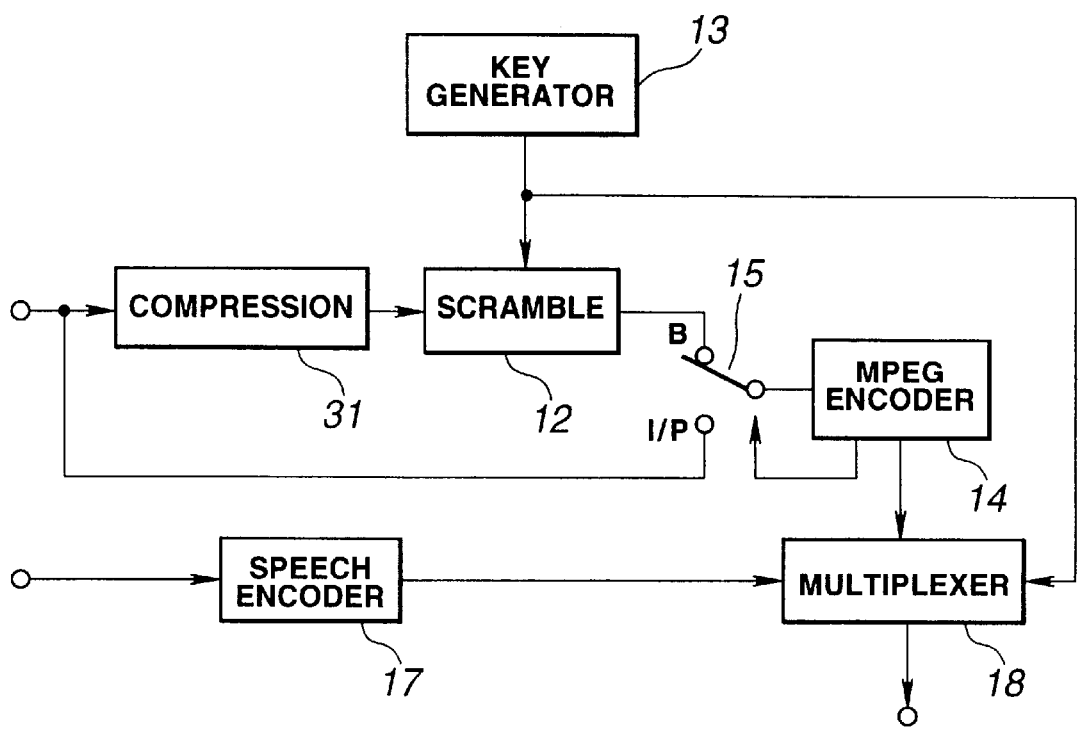
FIG. 7 is a block diagram for illustrating a second embodiment of a picture decoding method according to the present invention.

FIG. 7 illustrates a structure of the second embodiment.

In FIGS. 8A to 8G, FIG. 8A shows input picture signals. These signals are compressed by a compression device 31 in the horizontal direction to give picture signals of 704 pixels shown in FIG. 8B. The compression device 31 used is designed to generate pixels between plural neighboring pixels by pixel averaging. As may be seen from the drawing, a circle in the screen is an ellipse having its long axis in the up-and-down direction.

The scrambler 12 adds a set of macro-blocks, each made up of invalid pixels, to the left side of the processed picture signals. These macro-blocks are placed alternately at left and right sides as shown in FIGS. 8D to 8G. On which of the left and right sides the macro-blocks are placed depends on the key signals from the key generator 13. The key signals may be random or periodic as in the first embodiment described above. The picture signals are directly encoded by the MPEG encoding device 14.

The decoding device can discern the location of addition of the macro-blocks of invalid pixels from the key signals and hence deletes these macro-blocks. In addition, the decoding device restores the 704 pixels to 720 pixels by an expansion device.

By characteristics of the human visual sense, a picture collapsed in its transverse width by 2% at most in the present instance a scarcely perceived. Therefore, if the invalid pixels are restored to the respective original positions (left side) and directly reproduced or replaced by data of a set of neighboring macro-blocks, practically no problems are raised.

If there are no key signals, that is no decoding permission is accorded to the decoding device, the invalid pixels are directly reproduced, as a result of which the center of the picture is oscillated in the left-and-right direction to produce flickers to raise difficulties in normal reproduction.

FIGS. 9A to 9G show an instance in which the groups of macro-blocks are located on two sides. The picture is compressed in the left-and-right direction and in the up-and-down direction for securing areas for the sets of macro-blocks on the left and lower sides. Morever, the locations of the macro-block sets are sequentially shifted to be left and lower sides, right and upper sides, right and lower sides and left and upper sides, as shown in FIGS. 9D, 9E, 9F and 9G, respectively. In this case, four keys are used, namely 0(00), 1(01). 2(10) and 3(11) denote the positions of the presence of the macro-block sets, that is the left end and the lower end, right end and the upper end, right end and the lower end and the left end and the upper end. Thus it suffices to add 2-bit identification signals per picture.

In the present instance, the compression device 31 compresses data both in the horizontal direction and in the vertical direction, as shown in FIGS. 9A and 9B. Therefore, since each picture is compressed from 720 pixels to 704 pixels in the horizontal direction and from 480 pixels to 464 pixels in the vertical direction, the resulting picture is collapsed in the up-and-down direction, as shown in FIG. 9C.

In the present instance, the macro-block sets made up of invalid pixels are written in an area obtained on compression.

In the decoding device, the positions of addition of the macro-block sets made up of invalid pixels can be discerned, so that these macro-block sets are removed. The picture is restored to its normal ratio by an expander in both the horizontal and vertical directions.

By characteristics of the human visual sense, distortion of several percent can hardly be perceived. Therefore, the invalid pixels can be restored to the original positions and reproduced directly or replaced by data of the neighboring macro-block data without causing any practical inconveniences.

Conversely, should there be no key signals, that is should there be no decoding permission in the decoding device, the invalid pixels are present, so that the reproduced picture produced flicker which gives an impression of the reproduced picture being rotated on the screen thus disabling normal reproduction.

What is claimed is:

1. A picture encoding method of encoding an input picture signal by an MPEG encoding method, comprising:
    adding at least a set of invalid macro-blocks on a peripheral portion of a picture represented by the input picture signal;
    outputting a signal identifying the position of the at least one set of added macro-blocks;
    scrambling the picture signal by varying the position of the at least one set of macro-blocks responsive to a sequence;
    MPEG encoding the scrambled picture signal; and
    multiplexing the MPEG encoded picture signal with the position identifying signal.

2. The picture encoding method as claimed in claim 1 wherein the position of the at least one set of macro-blocks is selected periodically from at least one of upper, lower, left, and right sides of the input picture signal.

3. The picture encoding method as claimed in claim 1 further comprising:

a key generating step of determining the position of the at least one set of macro-blocks at random;

the position of the at least one set of macro-blocks being selected at random from at least one of upper, lower, left and right sides of the input picture signal.

4. The picture encoding method as claimed in claim 1 further comprising the step of storing the multiplexed signal.

5. The picture encoding method as claimed in claim 1 further comprising the step of storing the MPEG encoded picture signal and the position identifying signal in distinct areas of memory.

6. A picture decoding device for forming moving pictures from at least a scrambled MPEG encoded picture signal comprising:

means for separating from a multiplexed signal at least the MPEG encoded picture signal and a signal identifying the positions of invalid macro-blocks added to a picture represented by the picture signal;

means for decoding the MPEG encoded picture signal;

means for descrambling the decoded picture signal by correcting the offset of the decoded picture signal in accordance with the positions of the added invalid macro-blocks; and means for outputting at least the descrambled picture signal.

7. A picture encoding device for encoding an input picture signal by an MPEG encoding method, comprising:

means for adding at least a set of invalid macro-blocks on a peripheral portion of a picture represented by the input picture signal;

means for outputting a signal identifying the position of the at least one set of added macro-blocks;

means for scrambling the picture signal by varying the position of the at least one set of the macro-blocks responsive to a sequence;

means for MPEG encoding the scrambled picture signal; and means for multiplexing the MPEG encoded picture signal with the position identifying signal.

8. The picture encoding device as claimed in claim 7 further comprising means for selecting the position of the at least one set of macro-blocks periodically from at least one of upper, lower, left, and right sides of the input picture signal.

9. The picture encoding device as claimed in claim 7 further comprising means for selecting the position of the at least one set of macro-blocks at random from at least one of upper, lower, left and right sides of the input picture signal.

10. The picture encoding device as claimed in claim 7 further comprising means for storing the multiplexed signal.

11. The picture encoding device as claimed in claim 7 further comprising means for storing the MPEG encoded picture signal and the position identifying signal in distinct areas of a memory.

12. A picture decoding method of forming moving pictures from at least a scrambled multiplexed MPEG encoded picture signal comprising the steps of:

separating from the multiplexed signal at least the scrambled MPEG encoded picture signal and a signal identifying positions of invalid macro-blocks added to the MPEG encoded picture signal;

decoding the MPEG encoded picture signal;

correcting an offset of the decoded MPEG encoded picture signal in accordance with the positions of the added invalid macro-blocks so as to provide a descrambled picture signal; and outputting at least the descrambled picture signal.

\* \* \* \* \*